March 17, 1931.   J. E. HUTCHINSON ET AL   1,796,289
INDICATOR FOR VEHICLES
Filed Jan. 21, 1930    2 Sheets-Sheet 2
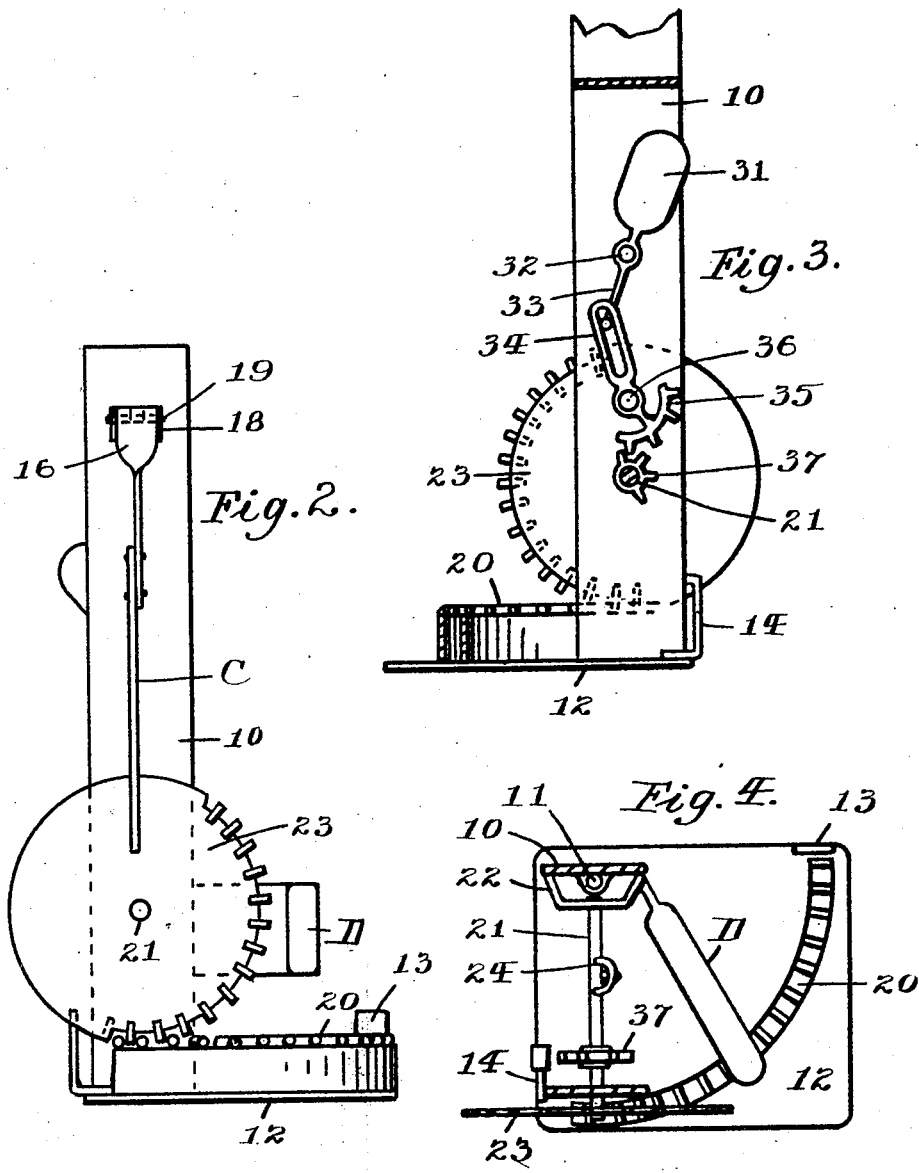
Inventors: James E. Hutchinson
John R. Young Jr.
by: [signature]
Attorney Patented Mar. 17, 1931

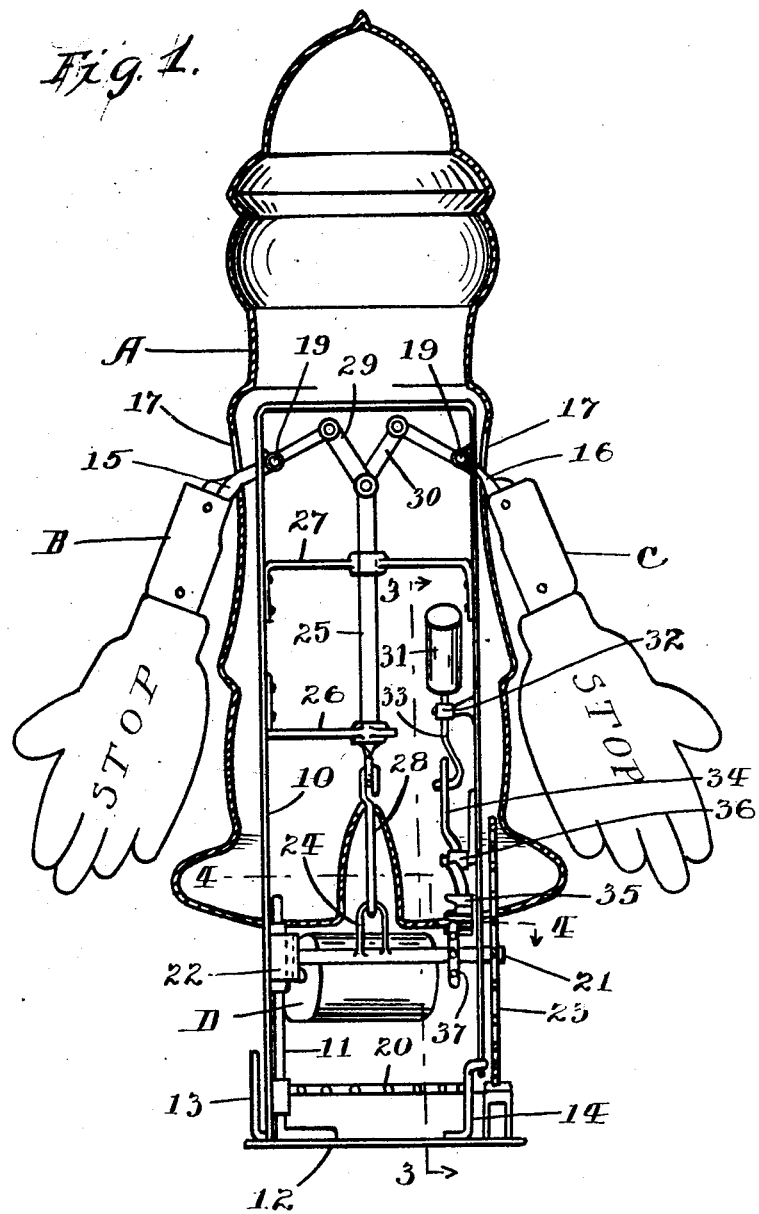

1,796,289

UNITED STATES PATENT OFFICE

JAMES E. HUTCHINSON AND JOHN R. YOUNG, JR., OF COMPTON, CALIFORNIA

INDICATOR FOR VEHICLES

Application filed January 21, 1930. Serial No. 422,248.

Our invention relates to improvements in indicators for vehicles used for the purpose of reducing the hazard of rear end collisions. The primary object is to provide a simple and inexpensive structure on a vehicle which will automatically imitate to a degree the movements of the arms of a traffic officer to warn the operator of a vehicle following in a manner resembling an officer directing traffic at a street intersection.

Several arrangements have been employed for transmitting signals from the driver to an indicator in the back of a vehicle and our invention relates to that class of indicators which is automatically operated by accelerative and retardative movements of the vehicle. A further object is the production of a device of the class stated which is inexpensive to operate and less liable to disorder than in prior devices.

In the accompanying drawings forming part of this specification: Figure 1 is a front elevation of our invention when the arms thereof are "at rest" position as when the vehicle is moving ahead, the figure representing the officer being shown in central vertical section; Fig. 2 is a side elevation of the structure shown in Fig. 1, when the figure representing the officer is removed; Fig. 3, is a section of a detail taken in the line 3—3 of Fig. 1, and Fig. 4, is a cross section taken on the line 4—4 of Fig. 1, when said figure representing an officer is removed.

A indicates a figure representing a miniature traffic officer, said figure having stop indicating arms B and C which as shown in Fig. 1 are in "at rest" position and which are adapted to swing upwardly during the retardative movement of the vehicle carrying the invention into horizontal or extended position as a stop warning to operators of rearwardly approaching vehicles. This figure which can be made in the form of a thin shell of celluloid or other suitable material is mounted upon the main skeleton carrying frame 10 which resembles a high yoke the lower end of one side of which is mounted upon the pivot 11 so that said frame may swing in a horizontal plane. Said pivot extends upwardly from a horizontal base 12, said base in turn being provided with end stops 13 and 14 which serve to limit the movement of said frame in an arc of forty-five degrees or one-fourth of a complete revolution. During the turning of the figure and its frame the arms B and C are adapted to be swung up or down according to the direction of said movement. Said arms have lever members 15 and 16 extending through openings 17 in the shell of Figure A and openings 18 in the sides of frame 10 and which are pivoted at 19 to said frame so as to tilt up and down and swing the arms into extended or at rest positions.

To operate said arms B and C a set of gearing consisting of the following members is provided. Arranged on the base 12 in an arc about the pivot 11 of said frame is a toothed quadrant 20 and carried in frame 10 above the base is a horizontal shaft 21, the inner end of which is journaled in a support 22 and the other end of which is journaled in the opposite side of frame 10. The outer end of shaft 21 carries a gear wheel 23 the teeth of which mesh with the teeth of quadrant 20, whereby as the frame 10 turns about its pivot revolving motion is transmitted to shaft 21. Said shaft has a lever arm 24 extending radially and coupled to a thrust shaft 25 which slides in supports 26 and 27 on said frame by means of link 28 to convert the revolving motion of shaft 21 into reciprocating motion. Said thrust shaft is coupled to the inner ends of lever arms 15 and 16 carrying the stop indicating arms B and C by a pair of links 29 and 30. Thus as the frame swings horizontally on its pivot the arms B and C are raised and lowered. An off set weight D carried by frame 10 near the pivot support causes the frame to revolve backwardly or forwardly when the vehicle carrying the indicator starts or stops, thus causing the stop arms to lower into "at rest" position or raise into outstretched stop indicating position. This movement also is adapted to cause the figure to face towards the side of the vehicle when the vehicle starts and to face backwardly so that the arms are in full view from the rear when the vehicle stops or slows down.

To hold the frame and its gearing in extreme forward or backward position and against movement except when the vehicle tends to start or stop the gearing for operating the arms B and C is provided with an off set weight 31 which is poised to swing by the starting and stopping movement of the vehicle over a horizontal pivot support 32 on the frame 10. This weight has a downwardly extending arm 33 freely engaged through a slotted member 34 to a toothed quadrant 35, said arm being pivoted at 36 on a side of frame 10. The teeth of quadrant 35 mesh with the teeth of a pinion 37 on shaft 21. Thus the counter weight 31 tends to hold the frame in forward or backward position but permits movement when a predetermined effort is exerted to start or stop the vehicle. This prevents said movement by vibration or minor efforts by the vehicle.

In use the indicator may be secured on the rear end of a vehicle preferably with its offset operating weight extending transversely of the vehicle while the figure faces sidewise with its stop indicating arms down and at rest position. In this condition when the vehicle tends to stop the operating weight swings the frame and its figure around until it faces rearwardly during which action the stop indicating arms are swung up into out stretched position in full view thus signaling the operator of a rearwardly approaching vehicle to stop. Starting the vehicle again returns the frame and figure to at rest position. During these movements the drag weight tends to hold the frame and figure in either extreme position and against movement except by an appreciable effort of the vehicle tending to start or stop. In accordance with the patent statutes we have described the principles of operation of our invention together with the apparatus which we now consider to represent the best embodiment thereof but we desire to have it understood that the construction shown is only illustrative and that the invention can be carried out by other means and applied to uses other than those above set forth within the scope of the following claims.

Having described our invention what we claim is new and desire to secure by Letters Patent is:

1. A signal for vehicles, comprising, in combination, a base, a frame pivotally hung to swing in substantially a horizontal plane, a figure carried by said frame and adapted to be swung horizontally from a position facing rearwardly to a position facing sidewise and vice-versa, a pair of arms for said figure hinged to swing down into at rest position and up into extending stop signaling position, means actuated by the horizontal movement of said frame for raising and lowering said arms and an offset weight carried by said frame and adapted to influence the operation of said raising and lowering means through the action of inertia.

2. A signal for vehicles, comprising, in combination, a base, a frame pivotally hung to swing in a substantially horizontal plane, a figure carried by said frame and adapted to be swung horizontally from a position facing sidewise and vice-versa, means for limiting the movement of said frame at either extremity of said movement, a pair of arms for said figure hinged to swing down into at rest position and up into extended signaling position, gearing actuated by the horizontal movement of said frame for raising and lowering said arms, off set weight means carried by said frame and adapted to influence the operation of said gearing through the action of inertia, and a drag having a tiltable weight actuated by said gearing to restrain the movement of said frame at either extremity of its stroke.

3. An indicator for vehicles, comprising, in combination, a base adapted to be mounted upon a vehicle, a figure frame swiveled vertically above said base and adapted to turn freely substantially horizontally from a position facing rearwardly to a position facing sidewise and vice versa while said base remains stationary, an arm element extending from said frame and hinged to swing down into at rest position when the frame faces rearwardly and up into extending stop signaling position when the frame faces sidewise, means actuated by the horizontal swinging movement of said frame for raising and lowering said arm, and an off set weight carried by said frame and adapted to influence the simultaneous turning movement of said frame and the operation of said raising and lowering means through the action of inertia when the vehicle stops or starts.

In testimony whereof we have signed our names to this specification.

JAMES E. HUTCHINSON.
JOHN R. YOUNG, Jr.